Oct. 9, 1951  W. B. ELMER  2,570,331
HEAT CONTROL SYSTEM
Filed June 15, 1948
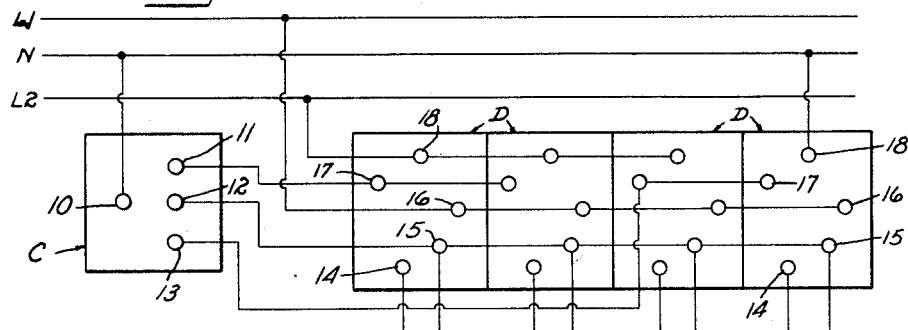
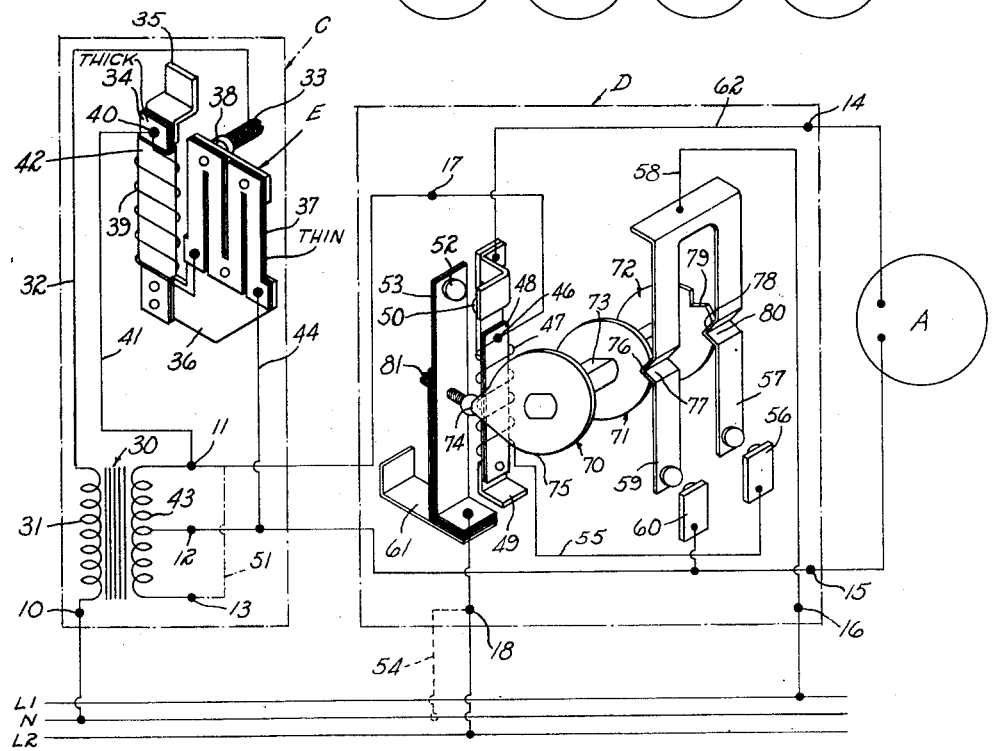
Inventor
WILLIAM B. ELMER
By T. Clay Lindsey
Attorney Patented Oct. 9, 1951

2,570,331

UNITED STATES PATENT OFFICE 2,570,331

HEAT CONTROL SYSTEM

William B. Elmer, Aurora, Ontario, Canada

Application June 15, 1948, Serial No. 33,177

4 Claims. (Cl. 200—122)

The present invention relates generally to electrical heat control systems, and more particularly to an improved apparatus and system for regulating the electrical energy input to an electrical heating device which may be selectively set to procure a desired controlled heating rate. The mechanism of the present invention has particular advantage for use in the control of the heating rate of one or more electrical surface heating units of the type used, for example, in domestic electrical ranges or stoves.

It is an object of the present invention to provide a heat control system which will provide improved regulation of the heating rate so that the heat produced by the controlled electrical heating units can be more precisely set and variations in heating rate will be held to a minimum. In connection with this object, it is desired to provide a mechanism which will function efficiently under all conditions of operation and which, for example, will automatically compensate for the usual fluctuations in power supply so that the desired set heating rate will be obtained without further adjustments of the system.

Another object of the invention is to provide an electrical heat control system of this type which will not involve any complex constructions or expensive parts or elements which will be difficult to fabricate and assemble. In this connection, it is an aim to provide a heat control system which will be effective without modification for one or a plurality of electrical heating units, and which utilizes constructions which are rugged and foolproof in operation with the elimination of breakdowns and failures, thereby providing satisfactory service over long periods of time without repair or adjustment.

A principal object of the present invention is to provide a heat control system of the thermostatic switch type which will permit the use of a single type of switch for all installations, that is, regardless of heater unit ratings, this being effected by providing a system in which the action of the individual switches is not dependent on the amount of power consumed by the heating unit being controlled.

Another object of the invention is to provide a timing device of the thermal type for a heating system which eliminates the use of snap type switches and which permits the use of a low voltage heating circuit for the thermal elements thereby reducing the possibility of short circuits, said low voltage heating circuit being completed without any intervening switches and thus eliminating the problems attendant to low voltage contacts.

A further object of the invention is to provide a heat control system of the character referred to which involves periodical off and on time intervals and, nonetheless, will be immediately responsive when the heating units are turned on to automatically provide an immediate initial on period of extended duration thereby insuring improved "warm-up" performance.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing—

Figure 1 is a schematic wiring diagram of a heat control system embodying the present invention shown in connection with four surface heating units and a single phase three wire power supply; and Fig. 2 is an enlarged wiring diagram of the system shown in connection with one of the surface heating units, the switches of the system being shown in perspective.

Referring to the drawing, the specific example of a heat control system embodying the present invention is shown in Fig. 1, to demonstrate the versatility of the system, as connected for use with three heating units denoted by reference letter A having a high voltage rating (for example, 236 volts) and a fourth heating unit B having a low voltage rating (for example, 118 volts). Power is adapted to be supplied to these heating units from a conventional three-line single phase power supply denoted by the references L1, N and L2, the voltage across L1 and N and across L2 and N being 118 volts while the voltage across L1 and L2 is 236 volts. These specific voltages and voltage ratings are, of course, given merely by way of illustration and the same results could obviously be obtained with other values thereof. It also is immaterial from the standpoint of the invention whether or not the power supply is a two or three wire system or whether it is poly-phase instead of a single phase power supply.

In accordance with the invention; the heating units A and B regardless of rating may be manually controlled by identical individual switch mechanisms generally denoted by reference letter D. Each of these switch mechanisms D, as aforesaid, may be of identical construction and as hereinafter explained are of a thermostatic type, power for operating the thermostatic elements being derived in accordance with the invention from an improved timer apparatus generally denoted by reference letter C.

Before taking up the system of the present invention in detail, the following explanation of the exterior wiring diagram of the system as shown in Fig. 1 may be helpful in the understanding of the invention. The timer unit C is provided with four terminals: terminal 10 is connected to the power line N while terminals 11, 12 and 13 provide a periodic or intermittent low voltage supply for energizing the heater wires of the switches D as more fully explained hereinafter. In the specific embodiment, the voltage across terminals 11 and 12 and across 12 and 13 is the same.

Each of the switch units D is the same and thus the same reference numerals are utilized throughout. Each unit is shown provided with five terminals 14, 15, 16, 17 and 18, terminals 14 and 15 being for connection to the heating units A and B and terminals 16 and 18 being for connection to the power supply lines. For simplicity, terminal 16 in each case is connected to power line L1, terminal 18 in the cases of the switch units operating the heater units A of high voltage rating being connected to power line L2 and terminal 18 of the remaining switch unit being connected to power line N.

The low voltage heater wire supply from timer unit C is applied to the switches D through terminals 15 and 17. Again for simplicity, terminal 15 in each case is connected to terminal 12 of the timer unit C. To balance the load, terminals 17 of two of the switches are connected to terminal 11 while the terminals 17 of the remaining switches are connected to terminal 13.

Referring to Fig. 2 of the drawing, the details of construction of the timer unit C and one of the switch units D are set forth. Referring to the timer unit, the same includes a transformer 30 having a primary 31 which is connected at one end to the terminal 10 which, in turn, is connected to the power supply line N as previously described. The opposite end of the primary 31 is connected by line 32 to an adjustable contact 33 of a thermostatic switch mechanism generally denoted by the reference letter E. The thermostatic switch E comprises a bimetallic arm 34 which is anchored at one end by the bracket 35 and which has mounted thereon at the other end by means of an insulating bracket 36 a second bimetallic element 37. The bimetallic element 37 has mounted thereon an electrical contact 38 adapted to be moved into and out of electrical contacting position with respect to the electrical contact 33. The bimetallic elements 34 and 37 are so arranged that their effect is opposite and compensatory, that is, when the temperature of element 37 is increased it tends to close the contacts 33 and 38 and when the temperature of element 34 is increased it tends to open contacts 33 and 38. However, a like change in temperature of both of these elements will cause the contact 38 to maintain without change its physical position relative to the contact 33. Bimetallic element 34 is preferably made thicker than element 37 so as to provide it with a greater thermal capacity than that possessed by element 37, this for the reasons set forth more fully hereinafter.

A Nichrome heater wire 39 is wound around the bimetallic element 34 and separated therefrom by electrical insulating material 42. One end of heater wire 39 is connected to the bimetallic element 34 at 40 and, by line 41, to terminal 11 of the secondary winding 43 of the transformer 30. The opposite end of the Nichrome heater wire 39 is connected to one end of the bimetallic element 37 while the opposite end of the bimetallic element 37 is connected by line 44 to terminal 12 of the transformer secondary 43.

When switch E is closed, the primary 31 of transformer 30 is connected across power line N and terminal 12. As more fully explained hereinafter, terminal 12 is connected to power line L1 when the system is in operation. In other words, the transformer 30 is so designed that the primary thereof may be placed across the lower voltage of the three-line power supply. The secondary winding 43 is intended to provide a relatively low heating voltage, for example, of the order of 1.6 volts. A split secondary is utilized merely to provide better balancing and less regulation of the transformer secondary voltage.

Terminal 11 going to one end of the secondary 43 is connected, as previously described, to the terminals 17 of two of the switch mechanisms D. In the case of the remaining switches, this connection would to be terminal 13 as shown in the dash line 51 of Fig. 2. As shown in Fig. 2, these terminals 17 are connected at 46 to one end of the Nichrome heater wire 47 which is wound around a bimetallic arm 48 which is supported at one end on the bracket 49 and which carries an insulated electric contact member 50 at its opposite free end. The Nichrome heater wire 47 is in electrical contact with the bimetallic arm 48 at 46 so as to insure that the potential difference between the Nichrome wire and the bimetallic element will never exceed the output voltage of the transformer secondary 43. The insulated electrical contact 50 is adapted to make a contact with a second electrical contact member 52 which is supported on the free end of a second bimetallic arm 53 which is resiliently mounted on a flexible supporting member 61. When bimetallic arm 48 is heated by Nichrome wire 47, its free end is adapted to move away from adjustable arm 53 in a direction to open the circuit through contacts 50 and 52, and vice versa. Bimetallic arm 53 is arranged to operate in response to temperature changes in a direction similar to that of bimetallic arm 48 and as nearly compensatory as possible so as to minimize the effects of changes in switch temperature. The arm 53 is connected to terminal 18 which is connected in turn to the power supply line L2 in the case of a heating unit of the A type having the higher voltage rating or, as shown, by the dash line 54 to the power line N in the case of a heating unit of the B type having the lower voltage rating.

The opposite end of the Nichrome wiring 47 is connected by line 55 to a stationary electrical contact member 56 which is positioned for contact by the movable switch arm 57. Switch arm 57 is connected by line 58 to the terminal 16 which, as previously indicated, is connected to the power supply line L1.

A second switch arm 59 is also connected to the line 58 and thus to the power supply line L1 and this switch arm 59 is adapted to be brought into contact with a stationary switch contact 60 which is connected to terminal 15. Terminal 15, as previously described, is connected to terminal 12 or midpoint of the transformer secondary 43. Terminal 15 is also connected to one side of the associated heater unit A or B. The opposite side of the heater unit A or B is connected to the terminal 14 which is connected by line 62 to electrical contact 50 mounted on the free end of the bimetallic element 48 although electrically insulated therefrom.

The position of the switch arms 53, 59 and 57 are adapted to be actuated by a single control comprising a plurality of cams 70, 71 and 72 fixed on a shaft 73 which is adapted to be manually turned or set by the user of the apparatus. The cams 70, 71 and 72 are preferably made of insulating material. The cam 70 is adapted to control the switch arm 53 by contact with set screw 81 and is eccentrically formed with a high point 74 and decreasing in a clockwise direction as viewed in Fig. 2 first with a short rapid drop and then with a long gradual decrease to a low point 75 immediately preceding the high point 74. Because of the resilient mounting of arm 53, the same is biased into contact with cam 70 and yet may be moved by the rotation of cam 70 without strain.

The cam 71 in its simplest form is merely a disk having a notch 76 therein for receiving a V-shaped projection 77 on the switch arm 59. The cam 72 may be similar having a plurality of notches 78 and 79 for receiving a V-shaped projection 80 on the switch arm 57.

As viewed in the drawing, the switch is in the full off position with the high point 74 of the cam 70 resting against the set screw 81, thus insuring that the electrical contact 52 will be spaced from the electrical contact 50 while cam 71 is so positioned that the projection 77 is received in the notch 76 thus insuring the breaking of the circuit at the electrical contact 60 while the projection 80 is received in the notch 78 thereby insuring the opening of the electrical circuit at the contact 56.

When it is desired to initiate the operation of the associated heater unit A or B, the shaft 73 is manually turned counterclockwise as viewed in the drawing. A suitable control knob and indicia (not shown) may be provided in any usual manner for facilitating the turning and setting of shaft 73. This counterclockwise movement of the shaft 73 causes the projections 77 and 80 to ride up on the periphery of the cams 71 and 72 thus closing the circuits at the electrical contacts 60 and 56. It also closes the circuit going through electrical contacts 50 and 52 thus connecting one side of the heater unit to power line N or L2. The closing of the circuit through electrical contact 60 immediately connects the other side of the heater unit to the power supply line L1. It also connects the primary 31 of the transformer 30 to the power supply line L1 through the bimetallic switch arm 37 and normally closed electrical contacts 33 and 38. This causes the energizing of the transformer 30 with the result that a voltage formed across the terminals 11 and 12 or 12 and 13 will be impressed on the Nichrome heater wire 47, one end of this heater wire 47 being connected to the switch terminal 17 and thus secondary terminal 11 or 13, as previously described, while the opposite end of the Nichrome wire 47 is connected through electrical contacts 56 and 60 to the switch terminal 15 and hence the secondary terminal 12. This causes the bimetallic arm 48 to heat up and eventually break the electrical circuit going through the contacts 50 and 52 to the associated heater unit A or B. At the same time that bimetallic arm 48 starts to heat, electrical energy is supplied to the bimetallic arm 37 and the heater wire 39 by the secondary winding 43. The combined effect of the current from the secondary 43 going through the bimetallic arm 37 and the heater wire 39 and the current going to the primary 31 of the transformer 30 through the bimetallic arm 37 causes the electrical contacts 33 and 38 to separate in due course, as will be described in the succeeding paragraph, thus deenergizing the transformer 30. The deenergizing of the transformer 30, of course, interrupts the heating of the bimetallic arms 37 and 34 as well as bimetallic arm 48 thus permitting the circuit to regain initial condition, that is, completing the cycle first by the closing of the contacts 50 and 52 and later by the closing of the contacts 33 and 38. By proper setting of the adjustable electrical contact 33, the timer circuit may be caused to operate at a desired cycling rate. As a specific example, it has been found desirable to so regulate the setting of the contact 33 that the switch E will open and close in cycles of approximately 60 seconds, the switch being open for approximately 30 seconds and then closed for the remaining 30 seconds.

The operations of the bimetallic elements 34 and 37 to produce the above-described cyclic action are as follows: Element 34 is substantially thicker than element 37, and, in addition, is wrapped with electrical insulation 42, which also serves as heat insulation, and, furthermore, is covered by Nichrome wire 39. By virtue of these differences, the element 34 has a relatively large thermal storage capacity, and element 37 has a relatively small one. A further feature of the construction is that the relative electrical resistances of the Nichrome wire 39 on element 34 and the bimetal grid 37 are different and differ in such a manner that the element 34 will, in time, notwithstanding its greater thermal capacity, exceed the temperature rise of element 37. In operation, then, when current first flows in the timer circuit described, element 37 warms rapidly and element 34 slowly. Since both elements flex in the same relative curvature, this initially increases the contact pressure between contacts 33 and 38. As the heating continues, element 37 rapidly reaches its maximum temperature and no further increase in contact pressure ensues. As the heating of element 34 continues well beyond the time that element 37 has reached its maximum curvature, the resulting curvature of element 34 increases until, after about 30 seconds, the curvature of element 37 has been more than compensated and contact 38 separates from contact 33, thus deenergizing the transformer 30. At the moment of interruption, both bimetals 34 and 37 immediately start to cool. Bimetal 37, having the smaller thermal capacity, cools much more rapidly than bimetal 34, resulting in an increasing of the gap between contacts 33 and 38. This gap increases for several seconds, until the gradual, but greater, cooling of element 34 finally, after approximately 30 seconds, recloses the contacts 33 and 38, restarting the cycle. In this manner, a long slow heating and cooling cycle is achieved without snap-acting or other usual mechanical means.

The periodic opening and closing of the switch E will cause a corresponding flexing of the bimetallic arm 48 of the switch D. The setting of the switch arm 53 by the position of the cam 70 will, of course, determine how soon such fluctuations of the arm 48 will cause the contacts 52 and 50 to open during each cycle. As the control shaft 73 is turned to a greater extent in a counterclockwise direction, the switch arm 53 is brought progressively closer to the bimetallic arm 48 so that the heating periods during each cycle are proportionately increased and at the higher or highest setting this movement is sufficient to keep the contacts 50 and 52 permanently closed thus assuring the maximum heating rate possible. At this setting, the notch 79 of cam 72 is brought into alignment with the projection 80 so as to open the circuit through the contact 56 and thus deenergize the Nichrome heater wire 47. The circuit through contact 60 remains closed at all times except when the switch is turned to the off position, as previously described.

In view of the above, it will be seen that a standard switch D, as previously described, may be used with any heater unit A or B regardless of the rating of such heater unit and, if desired, a plurality of heater units and switches D may be operated by a single timer unit C. In such case, to balance the load, one-half of the switches would be operated across the terminals 11 and 12 of the secondary 43 while the remaining half of the switches would be operated across terminals 12 and 13 of the secondary 43.

It is an advantage of the heat control system of the present invention that fluctuations in the power supply will be automatically compensated for by the operation of the timer control C. For example, if the line voltage should increase, there would be a greater voltage drop across the bimetallic arm 37, thus increasing the heating rate of that arm and, because of the greater output of the transformer 30, there would be an additional current flow in the bimetallic arm 37 as well as in the Nichrome heater wire 39. This resulting additional heating of the bimetallic arms 37 and 34 would increase the off periods of the switch, thus compensating for the higher heating rate of the heater units A and B due to the increased voltage of the power supply. In the event that the voltage should drop, the reverse action would occur.

Because of the low voltages utilized in the heated wire circuits, the danger of short circuits is greatly overcome. Also, because there are no switches in the low voltage circuits, the problem of low voltage contacts is not encountered. All snap action switches are eliminated and, therefore, the switches may be of relatively simple and rugged construction. The switches will give an infinite variation in the control of the heater circuits and will function efficiently and accurately over long periods of time.

When one of the switches D is first turned on, the associated heater unit is connected directly across the power lines so that the unit immediately begins to heat up. All of the switch elements being cold, it usually will require a longer period for the heater circuit to open in the first cycle so that this warm-up period is not only immediate but also somewhat extended to insure that a desired heating rate of heater A (or B) will be attained as rapidly as possible.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A timing mechanism adapted to be used in an electrical heat control system comprising a pair of bimetallic arms of substantially unequal heat capacity mounted in series, one bimetallic arm comprising a relatively long, thick bimetal member, an electrical heating element in heating relation thereto, and electrical insulation therebetween, the second said arm comprising a relatively short and thin bimetal member adapted to be heated internally by the flow of electric current within said second member; switch means adapted to be opened and closed by the conjoint action of said arms, the externally heated and relatively thick arm of higher heat capacity being arranged to open the switch and the internally heated and relatively thin arm of lower heat capacity being arranged to close the switch when the arms are heated, both said heating means for the arms operative when the switch is closed.

2. A timing mechanism adapted to be utilized in an electrical heat control system comprising a pair of bimetallic arms of substantially unequal heat capacity one bimetallic arm comprising a relatively long, thick bimetal member, an electrical heating element in heating relation thereto, and electrical insulation therebetween, the second said arm comprising a relatively short and thin bimetal member adapted to be heated internally by the flow of electric current within said second member; said arms secured together at one end, the opposite end of one arm being anchored and the opposite end of the other arm being provided with an electrical contact member for opening and closing a circuit, the externally heated and relatively thick arm of greater thermal capacity being arranged to flex in a circuit opening direction and the internally heated and relatively thin arm of lesser thermal capacity being arranged to flex in a circuit closing direction when heated, both said heating means for the arms operative when the switch is closed.

3. A timing mechanism adapted to be used in an electrical heat control system comprising a thermostatically operated switch having a fixed electrical contact member, a pair of bimetallic arms of substantially unequal heat capacity assembled in series, one bimetallic arm comprising a relatively long, thick bimetal member, an electrical heating element in heating relation thereto, and electrical insulation therebetween, the second said arm comprising a relatively short and thin bimetal member adapted to be heated internally by the flow of electric current within said second member; a second electrical contact member carried by one of said arms for movement toward and away from the first contact member, the externally heated and relatively thick arm of higher heat capacity being arranged to flex in a contact separating direction when heated and the internally heated and relatively thin arm of lower heat capacity being arranged to flex in a contact closing direction when heated, said arms being constructed and arranged to flex in substantially equal amounts in response to the same temperature changes, both said means for heating the arms when the contact members are closed constructed and arranged to heat the arm of higher heat capacity to a higher temperature than that to which the other arm is heated.

4. A timing mechanism adapted to be used in an electrical heat control system comprising a thermostatically operated switch assembly having a pair of bimetallic arms of substantially unequal thermal capacity, one bimetallic arm comprising a relatively long, thick bimetal member, an electrical heating element in heating relation thereto, and electrical insulation therebetween, the second said arm comprising a relatively short and thin bimetal member adapted to be heated internally by the flow of electric current within said second member; the first of said arms being anchored at one end and supporting the second arm on the opposite end, an electrical contact member carried by the second arm adapted when moved by said assembly to open and close the switch, the externally heated and relatively thick arm of higher thermal capacity being arranged to move the assembly in a switch opening direction and the internally heated and relatively thin arm of lower thermal capacity being arranged to move the assembly in a switch closing direction when heated, said arms being constructed and arranged to flex in substantially equal amounts in response to the same temperature changes, both said means for applying heat to the arms while the switch is closed constructed and arranged to heat the arm of higher thermal capacity to a higher temperature than that to which the other arm is heated.

WILLIAM B. ELMER.

REFERENCES CITED

The following references are of record in the file of this patent:

UNITED STATES PATENTS

| Number | Name | Date |
|---|---|---|
| 1,697,040 | Appelberg | Jan. 1, 1929 |
| 1,908,676 | Appelberg | May 16, 1933 |
| 2,209,768 | Dillman | July 30, 1940 |
| 2,284,383 | Elmer | May 26, 1942 |
| 2,421,519 | Penk | June 3, 1947 |